US008811743B2

(12) United States Patent  (10) Patent No.: US 8,811,743 B2
Kapoor et al.  (45) Date of Patent: Aug. 19, 2014

(54) RESOURCE-AWARE COMPUTER VISION

(75) Inventors: Ashish Kapoor, Kirkland, WA (US);
Sudheendra N. Vijayanarasimhan,
Austin, TX (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 12/796,686

(22) Filed: Jun. 9, 2010

(65) Prior Publication Data

US 2011/0305392 A1   Dec. 15, 2011

(51) Int. Cl.
*G06K 9/46* (2006.01)
*G06K 9/66* (2006.01)
*G06K 9/34* (2006.01)
*G06K 9/00* (2006.01)
*G06K 9/62* (2006.01)
*G06K 9/68* (2006.01)
*G06K 9/70* (2006.01)

(52) U.S. Cl.
USPC ........... 382/190; 382/173; 382/181; 382/192; 382/194; 382/195; 382/203; 382/209; 382/224; 382/225; 382/227

(58) Field of Classification Search
None
See application file for complete search history.

(56) References Cited

U.S. PATENT DOCUMENTS

| | | | |
|---|---|---|---|
| 5,710,833 A | 1/1998 | Moghaddam et al. | |
| 6,633,846 B1 * | 10/2003 | Bennett et al. | 704/257 |
| 6,738,494 B1 * | 5/2004 | Savakis et al. | 382/100 |
| 6,813,390 B2 * | 11/2004 | Ali | 382/278 |
| 6,954,544 B2 | 10/2005 | Jepson et al. | |
| 7,406,212 B2 | 7/2008 | Mohamed et al. | |
| 7,574,053 B2 * | 8/2009 | Baatz et al. | 382/224 |
| 8,161,486 B2 * | 4/2012 | Illmann | 718/104 |
| 8,165,344 B2 * | 4/2012 | Shirasaka | 382/103 |
| 2008/0057894 A1 * | 3/2008 | Aleksic et al. | 455/187.1 |
| 2008/0137956 A1 | 6/2008 | Yang et al. | |

FOREIGN PATENT DOCUMENTS

WO    2009103996 A1    8/2009

OTHER PUBLICATIONS

Last et al.. "Anytime Algorithm for Feature Selection", Rough Sets and Current Trends in Computing Lecture Notes in Computer Science vol. 2005, 2001, pp. 532-539.*

Vijayanarasimhan, S. et al.; "Visual Recognition and Detection Under Bounded Computational Resources"; Proceedings of the IEEE Conference on Computer Vision and Pattern Recognition; CA; Jun. 2010; 8 pages.

Lee, Pei Y., "Geometric Optimization for Computer Vision", Retrieved at << http://infoeng.rsise.anu.edu.au/files/pei_yean_lee_thesis.pdf >>, Apr. 2005, pp. 144.

Loy, et al., "An Adaptive Fusion Architecture for Target Tracking", Retrieved at << http://ieeexplore.ieee.org/stamp/stamp.jsp?arnumber=01004164 >>, FGR, Proceedings of the Fifth IEEE International Conference on Automatic Face and Gesture Recognition, May 20-21, 2002, pp. 6.

(Continued)

*Primary Examiner* — Thomas Conway
(74) *Attorney, Agent, or Firm* — Dan Choi; Carole Boelitz; Micky Minhas (57) ABSTRACT

The described implementations relate to computer vision. In one case image data is received. Resource constraints associated with processing the image data are evaluated. Further, a visual recognition and detection processing strategy is selected for the image data based at least in part on the evaluated resource constraints.

20 Claims, 5 Drawing Sheets

(56) References Cited

OTHER PUBLICATIONS

Jaynes, Christopher O., "Seeing is believing: Computer Vision and Artificial Intelligence", Retrieved at << http://www.acm.org/crossroads/xrds3-1/vision.html >>, Retrieved Date: Jan. 15, 2010, pp. 8.
Torralba, et al., "Sharing Visual Features for Multiclass and Multiview Object Detection", Retrieved at << http://ieeexplore.ieee.org/stamp/stamp.jsp?arnumber=04135679 >>, IEEE Transactions on Pattern Analysis and Machine Intelligence, vol. 29, No. 5, May 2007, pp. 854-869.
Andreopoulos, et al., "A Theory of Active Object Localization", Retrieved at << http://www.cse.yorku.ca/~alekos/iccv09.pdf >>, International Conference on Computer Vision, ICCV09, 2009, pp. 8.
Arya, et al., "An Optimal Algorithm for Approximate Nearest Neighbor Searching Fixed Dimensions", Retrieved at << http://delivery.acm.org/10.1145/300000/293348/p891-arya.pdf?key1=293348&key2=8290553621&coll=GUIDE&dl=GUIDE&CFID=72963568&CFTOKEN=19496071 >>, Journal of the ACM (JACM), vol. 45, No. 6, Nov. 1998, pp. 891-923.
Butko, et al., "Optimal Scanning for Faster Object Detection", Retrieved at << http://mplab.ucsd.edu/wp-content/uploads/2139.pdf >>, Computer Vision and Pattern Recognition (CVPR), 2009, pp. 8.
Charikar, Moses S., "Similarity Estimation Technigues from Rounding Algorithms", Retrieved at << http://www.cs.princeton.edu/courses/archive/spr04/cos598B/bib/CharikarEstim.pdf >>, Annual ACM Symposium on Theory of Computing, Proceedings of the thiry-fourth annual ACM symposium on Theory of computing, May 19-21, 2002, pp. 9.
Dalal, et al., "Histograms of Oriented Gradients for Human Detection", Retrieved at << http://lear.inrialpes.fr/people/triggs/pubs/Dalal-cvpr05.pdf >>, CVPR, Proceedings of the 2005 IEEE Computer Society Conference on Computer Vision and Pattern Recognition (CVPR'05), vol. 1-vol. 01, Jun. 20-26, 2005, pp. 8.
Everingham, et al., "The PASCAL Visual Object Classes Challenge 2009 (VOC2009) Results", Retrieved at << http://www.springerlink.com/content/q1x28817540788n8/fulltext.pdf >>, 2010, pp. 36.
Felzenszwalb, et al., "A Discriminatively Trained, Multiscale, Deformable Part Model", Retrieved at << http://ieeexplore.ieee.org/stamp/stamp.jsp?tp=&isnumber=&arnumber=4587597&tag=1 >>, In Proceedings IEEE Conference on Computer Vision and Pattern Recognition, 2008, pp. 8.
Felzenszwalb, et al., "Pictorial Structures for Object Recognition", Retrieved at << http://www.cs.cornell.edu/~dph/papers/pict-struct-ijcv.pdf >>, International Journal of Computer Vision, vol. 61, No. 1, Jan. 2005, pp. 1-42.
Fergus, et al., "Object Class Recognition by Unsupervised Scale-Invariant Learning", Retrieved at << http://ieeexplore.ieee.org/stamp/stamp.jsp?tp=&isnumber=27266&arnumber=1211479 >>, Proceedings of the IEEE Conference on Computer Vision and Pattern Recognition, 2003, pp. 8.
Ferrari, et al., "Groups of Adjacent Contour Segments for Object Detection", Retrieved at << ftp://ftp.vision.ee.ethz.ch/publications/articles/eth_biwi_00595.pdf >>, IEEE Transactions on Pattern Analysis and Machine Intelligence, vol. 30, No. 1, Jan. 2008, pp. 36.
Ferrari, et al., "Accurate Object Detection with Deformable Shape Models Learnt from Images", Retrieved at << http://lear.inrialpes.fr/pubs/2007/FJS07/FJS07.pdf >>, Conference on Computer Vision & Pattern Recognition, Jun. 2007, pp. 8.
Ferrari, et al., "From Images to Shape Models for Object Detection", Retrieved at << http://www.vision.ee.ethz.ch/~calvin/Publications/ferrari09ijcv.pdf >>, International Journal of Computer Vision, 2009, pp. 1-20.
Goldstein, et al., "Redundant Bit Vectors for Quickly Searching High-Dimensional Regions", Retrieved at << http://research.microsoft.com/en-us/um/people/jplatt/bitvectors.pdf >>, 2005, pp. 22.
Gould, et al., "Peripheral-Foveal Vision for Real-time Object Recognition and Tracking in Video", Retrieved at << http://www.cs.stanford.edu/people/ang//papers/ijcai07-peripheralfoveal.pdf >>, International Joint Conference on Artificial Intelligence, Proceedings of the 20th international joint conference on Artifical intelligence, Jan. 6-12, 2007, pp. 7.
Kadir, et al., "An Affine Invariant Salient Region Detector", Retrieved at << http://www.robots.ox.ac.uk/~vgg/research/affine/det_eval_files/kadir04.pdf >>, Proceedings of the 8th European Conference on Computer Vision, 2004, pp. 1-14.
Lampert, et al., "Beyond Sliding Windows: Object Localization by Efficient Subwindow Search", Retrieved at << http://www.kyb.mpg.de/publications/pdfs/pdf5070.pdf >>, Proceedings of the IEEE Computer Society Conference on Computer Vision and Pattern Recognition (CVPR 2008), Jun. 2008, pp. 8.
Lazebnik, et al., "Beyond Bags of Features: Spatial Pyramid Matching for Recognizing Natural Scene Categories", Retrieved at << http://www-cvr.ai.uiuc.edu/ponce_grp/publication/paper/cvpr06b.pdf >>, CVPR, Proceedings of the 2006 IEEE Computer Society Conference on Computer Vision and Pattern Recognition, vol. 2, Jun. 17-22, 2006, pp. 18.
Leibe, et al., "Combined Object Categorization and Segmentation with an Implicit Shape Model", Retrieved at << http://citeseerx.ist.psu.edu/viewdoc/download?doi=10.1.1.5.6272&rep=rep1&type=pdf >>, In ECCV'04, Workshop on Statistical Learning in Computer Vision, May 2004, pp. 1-16.
Maji, et al., "Object Detection using a Max-Margin Hough Transform", Retrieved at << http://www.cs.berkeley.edu/~smaji/papers/smaji-cvpr09.pdf >>, IEEE Conference on Computer Vision and Pattern Recognition, CVPR, Jun. 20-25, 2009, pp. 8.
Mikolajczyk, et al., "A Comparison of Affine Region Detectors", Retrieved at << http://lear.inrialpes.fr/pubs/2005/MTSZMSKG05/affine_ijcv05.pdf >>, International Journal of Computer Vision, vol. 65, No. 1-2, Nov. 2005, pp. 1-36.
Munder, et al., "An Experimental Study on Pedestrian Classification", Retrieved at << http://ieeexplore.ieee.org/stamp/stamp.jsp?tp=&isnumber=&arnumber=1704841 >>, IEEE Transactions on Pattern Analysis and Machine Intelligence, vol. 28, No. 11, Nov. 2006, pp. 1863-1868.
Ommer, et al., "Multi-Scale Object Detection by Clustering Lines", Retrieved at << http://hci.iwr.uni-heidelberg.de/people/bommer/papers/ommer_cvl_iccv09.pdf >>, In International Conference on Computer Vision, ICCV'09, IEEE, 2009, pp. 8.
Papageorgiou, et al., "A Trainable System for Object Detection", Retrieved at << citeseerx.ist.psu.edu/viewdoc/download?doi=10.1.1.91 . . . >>, International Journal of Computer Vision, Special issue on learning and vision at the center for biological and computational learning, vol. 38, No. 1, Jun. 2000, pp. 15-33.
Quack, et al., "Efficient Mining of Frequent and Distinctive Feature Configurations", Retrieved at << http://ieeexplore.ieee.org/stamp/stamp.jsp?tp=&isnumber=&arnumber=4408906 >>, International Conference on Computer Vision (ICCV'07), Oct. 2007, pp. 8.
Viola, et al., "Robust Real-Time Face Detection", Retrieved at << http://www.springerlink.com/content/q70v4h6715v5p152/fulltext.pdf >>, International Journal of Computer Vision, vol. 57, No. 2, May 2004, pp. 137-154.
Winder, et al., "Picking the Best Daisy", Retrieved at << http://people.cs.ubc.ca/~mbrown/papers/cvpr2009.pdf >>, IEEE Conference on Computer Vision and Pattern Recognition, Jun. 20-25, 2009, pp. 8.
Ferrari, et al., "Object Detection by Contour Segment Networks", In Proceedings of the European Conference on Computer Vision, Jun. 2006, 14 pages.

* cited by examiner

RESOURCE-AWARE COMPUTER VISION

BACKGROUND

Visual recognition and detection relative to image data has progressed greatly in recent years. For instance, identifying a face from a photograph can be readily accomplished with existing technologies. However, visual recognition and detection remain computationally intensive tasks. Existing visual recognition and detection technologies are directed to performance, without considering resource usage. Accordingly, if these existing technologies are executed in a resource rich environment, a user may be satisfied with the outcome. However, the user experience may be less than satisfying if these existing techniques are executed in a resource constrained environment.

SUMMARY

The described implementations relate to computer vision and specifically to resource-aware computer vision techniques. In one case image data is received. Resource constraints associated with processing the image data are evaluated. Further, a visual recognition and detection processing strategy is selected for the image data based at least in part on the evaluated resource constraints.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application relates to image processing and more specifically to visual recognition and detection relative to images. Visual recognition and detection relative to images may be referred to herein as "computer vision" for sake of brevity. The present implementations can offer computer vision techniques that consider one or more parameters when making processing decisions. Examples of such parameters can be resource constraints and/or the output of the technique that is used in an iterative feedback loop that affects further processing. Examples of resource constraints can include memory, processing cycles, time, and/or power consumption, among others.

The present image processing techniques can select a computational strategy based at least in part on one or more of the constraints. For instance, if time is a limiting constraint (i.e., the user wants the results of the visual recognition and detection as soon as possible), the present implementations can appropriately schedule the next computation(s) to produce reasonable results within the required time frame. Stated another way, the present techniques can produce anytime results and can also utilize the principle of value-of-information (VOI) in order to provide high (and potentially the most) recognition value for the resources consumed.

Figure 1:
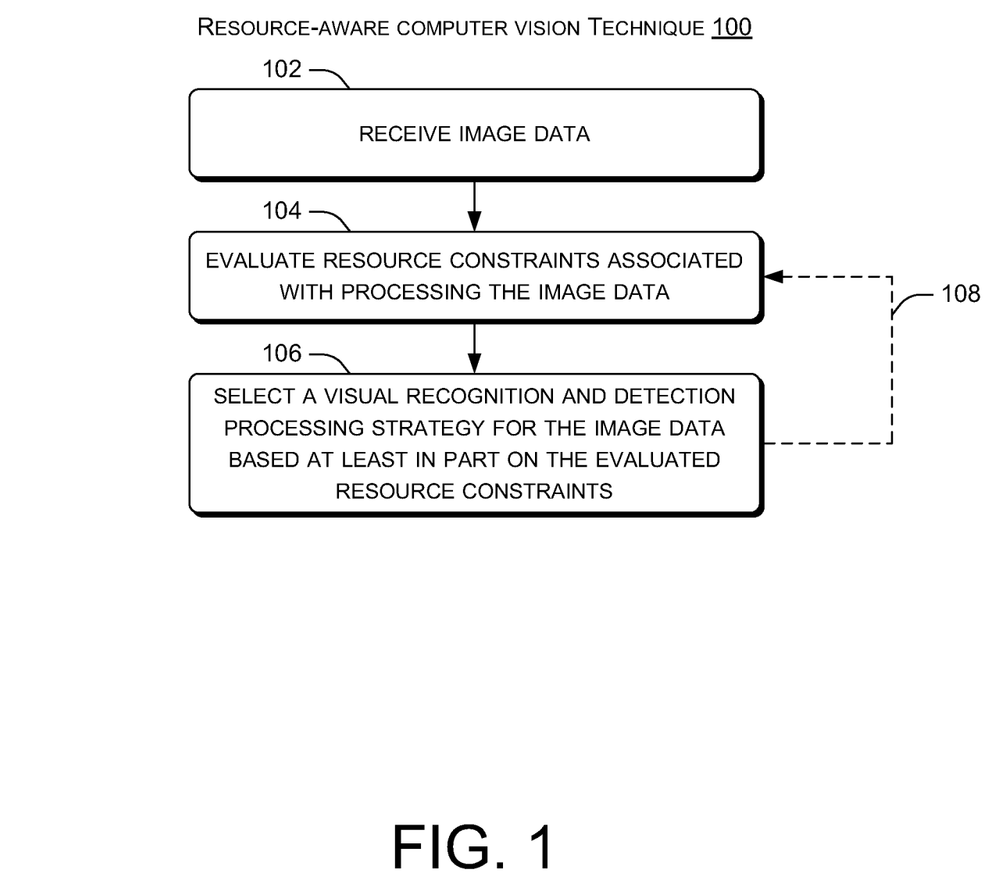
FIGS. 1-4 illustrate examples of resource-aware computer vision techniques in accordance with some implementations of the present concepts.

For purposes of explanation consider introductory FIG. 1 which shows a resource-aware computer vision technique 100. In this case, image data can be received at 102. For instance, the image data may be received when the user takes a picture (e.g., the image), or when the user loads images onto a device, such as from a camera to a personal computer.

Resource constraints associated with processing the image data can be evaluated at 104. Visual recognition and detection are computationally intensive tasks and traditionally the focus in computer vision has been on solving the problems regardless of the available computational resources. However, with recent emergence of ubiquitous computing devices such as mobile phones, laptops, and netbooks, the available computational power can become a primary consideration (i.e., constraint) in building systems that can work in real-time. Further, even in a resource rich platform, such as a PC, at any particular instance, the resources may be spread among many competing requests in addition to image processing requests. Instead of building separate algorithms that would work under different computational resources, some of the present techniques can be thought of as platform neutral (i.e., image processing can be based upon the available resources and/or constraints on those resources).

A computer vision strategy can be selected for the image data based, at least in part, on the evaluated resource constraints at 106. For instance, some of the present techniques can focus on a novel object classification/detection scenario that considers the computational resources and can scale across different computational platforms by making efficient use of resources. As indicated by dotted line 108, the evaluation and selection bocks may be dynamically repeated until image processing is completed or as dictated by a constraint, such as user imposed time constraints or diminishing returns (VOI) for the resource usage.

Stated another way, some of the present implementations can derive recognition techniques that consider constraints on computation and appropriately triage future actions in order to provide relatively high (and potentially highest) recognition power for the available computational resources. Alternatively or additionally, some of these computer vision techniques can provide anytime solutions, that is, they can provide a reasonable hypothesis even if the techniques are stopped before completion (i.e., time is a constraint).

In summary, the problem of accurately localizing instances of a category in an image can be a computationally intensive task because it can require matching complex object models to the observations in the image. There has been work on efficient object localization and detection. While such methods have provided state-of-the-art results on several tasks, these algorithms either need to run to completion to provide an answer or they cannot provide a useful solution. Consequently, in scenarios when there are bounded computational resources such passive methods will not degrade gracefully. To address this challenge, some of the present implementations can reason about available computational resources. These implementations can triage appropriate actions to take such that useful (and potentially the best) recognition can be performed under a specific computational budget. In particular, some of these implementations can collect evidence by determining: 1) the image regions to look at; and, 2) the features to extract from individual regions, for example. The determination of these regions and the features can be guided by the principle of value-of-information (VOI), where the algorithm selects regions and features that promise relatively high evidence at relatively low resource cost. Thus, these implementations can actively select both the feature location and feature type, unlike standard object recognition methods which are passive in the feature acquisition process. The present computer vision techniques are described by way of example relative to object recognition. Other applications of the present concepts can relate to face recognition, fingerprint recognition, and/or other pattern recognition tasks.

First Computer Vision Model Example

Figure 2:
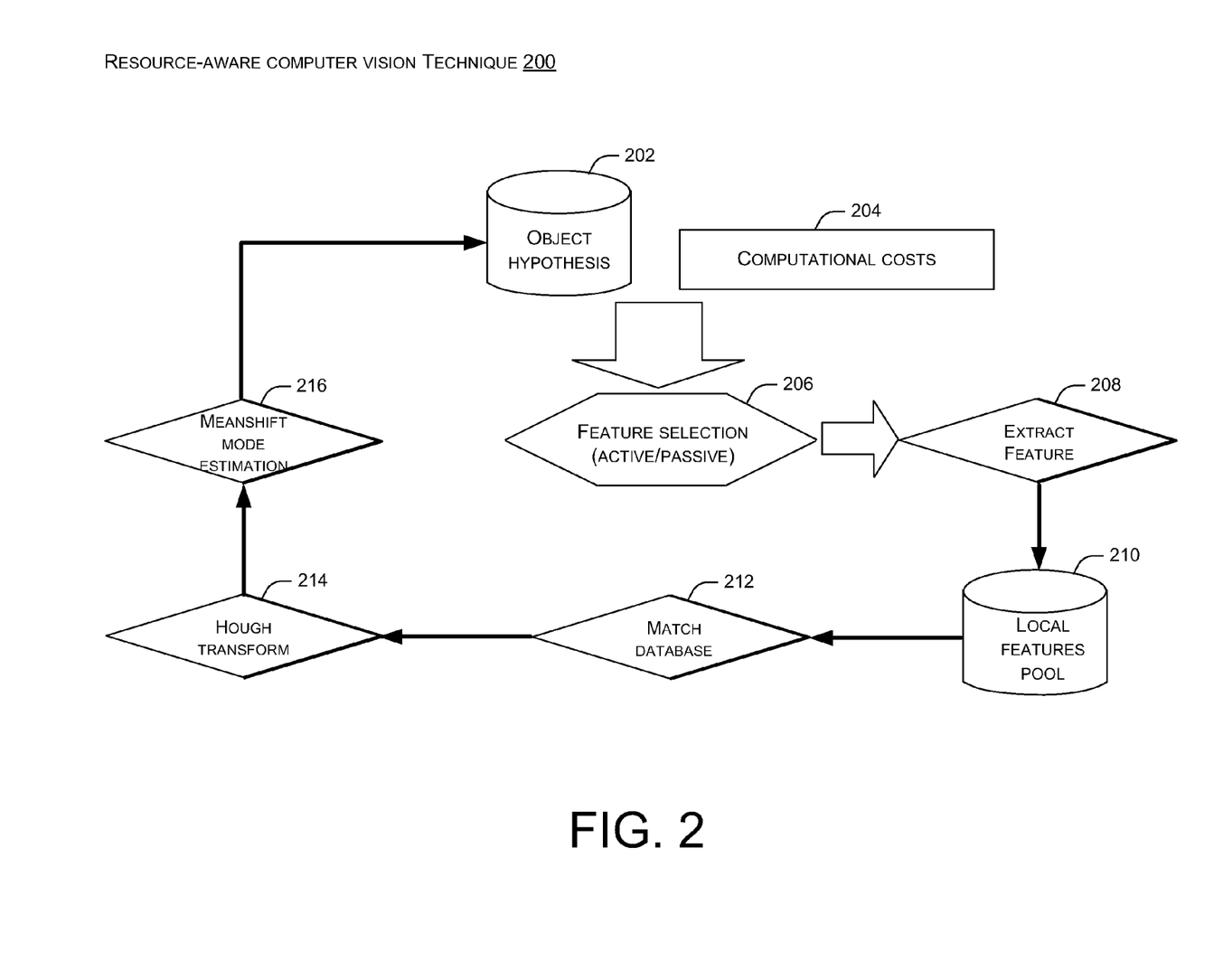

FIG. 2 shows a flowchart of a resource-aware computer vision algorithm or technique 200 that is described in detail below. Briefly, resource-aware computer vision technique 200 utilizes an object hypothesis 202 and computational costs 204 to accomplish feature selection at block 206. The feature selection is utilized to extract features at block 208. The extracted features are compared to a local features pool at block 210. Database matching is performed at block 212. The output of the database matching is processed with a Hough transform at block 214. The output of the Hough transform is further processed utilizing a meanshift mode estimation at block 216. The output of the meanshift mode estimation can then be considered with the object hypothesis 202 and computational costs 204 to further refine the resource-aware computer vision technique 200. This flowchart is explained in more detail below by way of example.

Image Example

Figure 3:
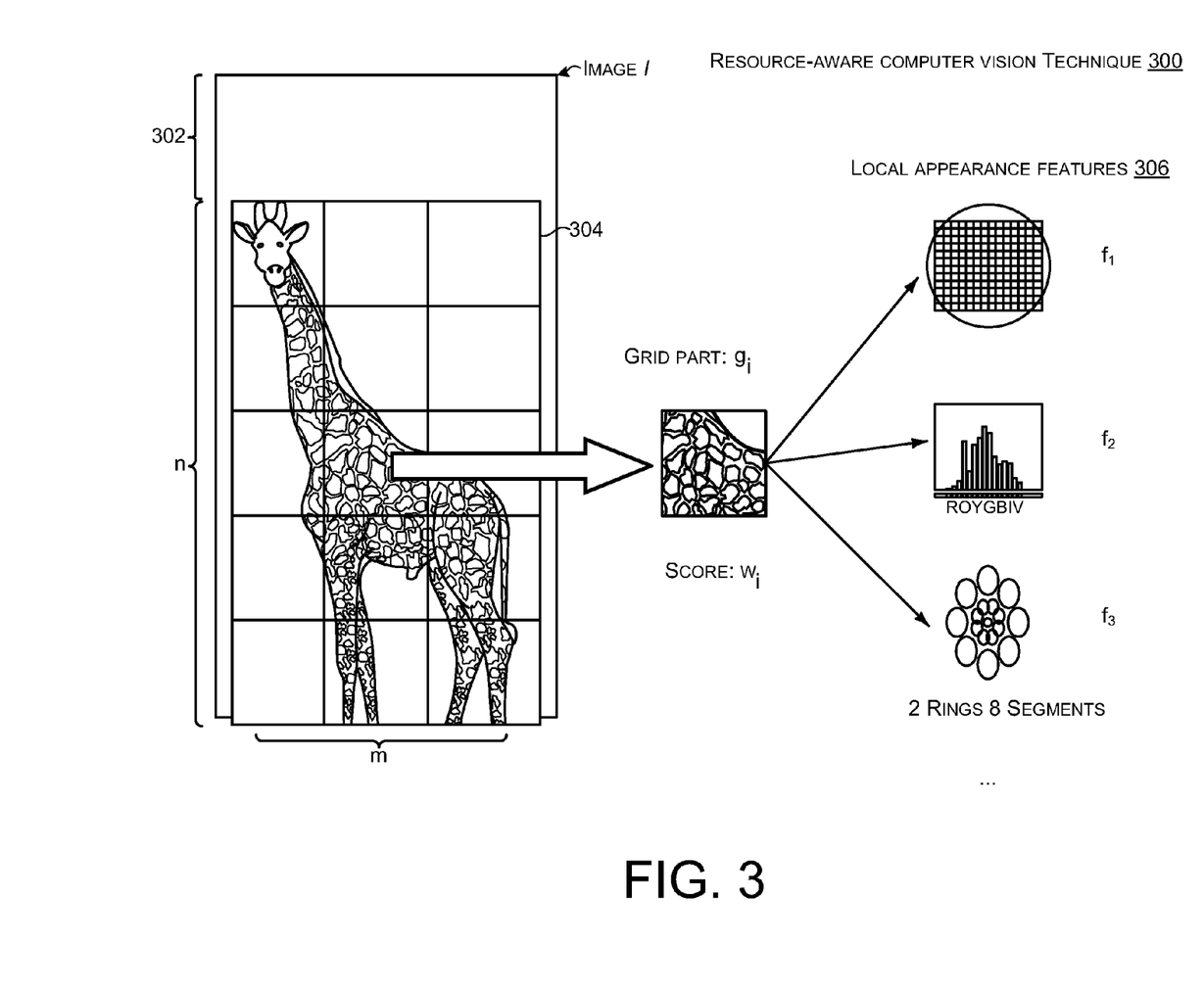

For purposes of explanation consider FIG. 3 which relates to a resource-aware computer vision technique 300. This computer vision technique 300 also relates to the computer vision technique of FIG. 2 beginning at object hypothesis 202.

FIG. 3 includes a test image I that may include an object (in this example the object is a giraffe). Resource-aware computer vision technique 300 can find parameters x that describe the extent (bounding box) of an object class O. The object (in this case a giraffe) can be divided into object portions by constructing a grid of size N=m*n. Each grid part or image region approximately captures a particular semantic portion of the object in any image as long as the overall pose of the object is fixed. Note that a remainder 302 of the image can be pruned from further processing as not having potential objects or object parts.

However, as seen in FIG. 3, not all grids belong to the object of interest (i.e., some grids do not contain any part of the giraffe). For instance, grid 304 does not include any portion of the giraffe. Even among grid parts that contain some part of a giraffe, certain object portions, like the head or body, might be more discriminative/detectable than other object portions, like the legs. Stated another way, detecting a head or body may have a relatively higher indicative value of the presence of the giraffe than detecting a leg(s). Therefore, resource-aware computer vision technique 300 can associate a weight parameter $w_i$ with each grid-part $g_i$ that reflects how important an individual object portion is for each object for the purpose of detection.

Note that grid part $g_i$ appears at a fixed location with respect to the object's extent x. The appearance of the object portion is then modeled based on evidence from local features collected within the grid part as indicated under the heading local appearance features 306. In this example, the local appearances features include three features $f_1$, $f_2$, and $f_3$. Features $f_1$, $f_2$, and $f_3$ represent examples of different kind of features that can be utilized for detecting objects. For example, $f_1$ can be a feature based on edges, $f_2$ can be a feature based on color, and $f_3$ can be another feature that is not based upon edges or colors. Briefly, these features might have different computational cost as well as discriminative power. Consequently, the present implementations can balance computational cost and detection capabilities in the computer vision task.

One motivation for resource-aware computer vision technique 300 employing this grid model relates to the above mentioned goal of computing the VOI of image regions during detection. Since, in some versions, each grid part always appears at a particular location with respect to the object's extent x, the weight $w_i$ of the grid part can provide a measure of the importance of analyzing the corresponding image region.

Formally, resource-aware computer vision technique 300 can obtain the score of the hypothesis (O,x) as the sum of the scores of each grid part ($g_i^{(O,x)}$) weighted by the probability that the object portion is present at the given location, based on the available features. For instance, let $F_I$ denote the set of features extracted from I, then the score can be written as:

$$S(O, x | F_I) = \sum_{i=1}^{N} w_i p(g_i^{(O,x)} | F_I) \quad (1)$$

Here $w_i$ is the importance weight of the object portion with respect to the hypothesized location x of the object O. The term $p(g_i^{(O,x)}|F_I)$ measures the evidence provided by the set of features $F_I$ for the grid-part. The object weight can be interpreted as the conditional probability that the object portion is present as evidenced by $F_I$, the set of extracted features. This term $F_I$ is modeled as a maximum over the probability of the object portion given each individual feature in $F_I$: $p(g_i^{(O,x)}|F_I)$ =$\max_{f \in F_I} p(g_i^{(O,x)}|f,l)$ where f is a feature in the set $F_I$ and l denotes the location (e.g., grid part) at which the feature was extracted.

The max function can be used instead of other operators (e.g. average) based upon the expectation that every object portion be defined by a single feature type (i.e., texture for Giraffe's body, shape for the head/legs). Further, an average over the probabilities might aggravate any ambiguity that already exists in the detection. Note that the two terms (e.g., f and l) in the equation to compute the score consider (1) how useful a particular location (e.g., object portion) is for detection and (2) the feature that provides the best evidence in detecting that object portion.

At block 212 in FIG. 2, the technique can estimate $p(g_i^{(O,x)}|f,l)$ using a simple nearest neighbor interpolation technique. In particular, the technique can consider a database of features $F_O$ for every object O that is constructed from a set of training images. The particular feature f is first matched to $F_O$ in order to recover the set of nearest neighbors (denoted as N(f)∈$F_O$). The required conditional probability is then modeled as the weighted sum of the probabilities of its nearest neighbors:

$$p(g_i^{(O,x)} | f, l) = \sum_{h \in N(f)} q_i^h p(h | f) \quad (2)$$

where h is a feature in the database $F_O$ and $q_i^h = p(g_i^{(O,x)}|h,l)$ refers to the conditional probability of the presence of the object portion given the features. In some implementations, this term is a model parameter that needs to be estimated from the training data for every feature h and every grid part $g_i$.

$$p(h \mid f) = \begin{cases} \frac{1}{Z} e^{\frac{-\|h-f\|2}{\gamma}} \\ 0 \quad \text{otherwise,} \end{cases} \quad (3)$$

if $\|h - f\|2 < \epsilon$,

Note that p(h|f,l) is replaced with p(h|f) since features are matched independent of their locations.

This technique can be adopted because with a large database the proposed method can approximate the actual conditional probability closely. Further, the whole operation can be performed fairly efficiently since fast nearest neighbor lookup can be performed using approximate nearest neighbor techniques. This approach can provide significant memory advantages over other techniques.

The above discussion defined the score of a detection hypothesis (O,x) based on features $F_I$ using the parameters $w_i, q_i$ for all the grid parts $g_i$ and features h in the database. The following discussion first shows how to obtain the detection hypothesis (O,x) using features $F_I$ and then shows how the rest of the model parameters can be estimated from a set of training images.

Determining Detection Hypotheses Using Hough Voting

This section relates to the Hough transform block 214 of FIG. 2. Part-based approaches allow parameterizing the object hypothesis. The approach further allows each grid part to vote for a point in hypothesis space. Thus, a globally consistent hypothesis can be obtained as modes in the voting space in an efficient manner.

Hence, given a set of features $F_I$, an object hypotheses (O,x) can be obtained by matching the features in the training database to cast votes. In some configurations, each feature casts votes for portions of objects. Further, since each grid-part appears at a fixed location with respect to the object, the features also vote for the object's extent indirectly.

The voting space is parameterized by the coordinates of the four corners of a object bounding box. The bounding box can be thought of as the representation where the algorithm thinks that the object lies. These coordinates or values can be stored with respect to the position of every feature in the training image using ground truth bounding box information. The ground truth bounding box can be thought of as the bounding box around objects in the training images. Thus, given a feature $f \in F_I$, its nearest neighbors, $h \in N(f)$, can be obtained from the training database, $F_O$, and cast a vote for the corresponding x with a confidence $q_i^h p(h|f)$ from Equation 2. Mean-Shift clustering can then be performed over the hypothesis space with a bandwidth parameterized by the height and width of the bounding boxes to obtain a set of globally consistent object hypotheses.

The above search procedure can be interpreted as a Parzen window probability density estimation for the object's parameters. Finally, the score of a hypothesis (O,x) is obtained as described above, using potentially all the features whose votes converged to (O,x) during the mean-shift procedure.

Estimating Model Parameters

The discussion below describes a way to estimate the model parameters ($w_i, q_i^h$), given a set of training images with ground truth bounding box information. The term $q_i^h$, where h is a feature in the training database $F_O$, can be interpreted as the probability that part i of object O is present inside the bounding box parameterized by x, given that feature h occurs at location l. Assuming that the probability $q_i^h = p(g_i^{O,x} | h, l)$ is zero whenever l is outside the grid $g_i$ and is independent of the location l. In other instances, the following simple way can be utilized for estimating this quantity:

$$q_i^h = p(g_i^{(O,x)} \mid h) \alpha \frac{p(h \mid g_i^{(O,x)})}{p(h)} \quad (4)$$

In other words, the technique can count the number of times feature h occurs within the ith grid of object O and divide it by the total number of times h occurs in the training database. However, each feature occurs only once in the training database and technically this would provide a single count. Hence, it can be assumed that the probabilities are smooth over the manifold of features and use a small number of nearest neighbors of h while performing the counts.

After estimating $q_i^h$ for all the features h in the training database the technique can run the resource-aware computer vision technique of FIG. 2 using uniform weights ($w_i = 1, \forall i$) on the training images (positive and negative) to obtain a set of hypotheses. A small number of high scoring negative hypotheses can be selected along with the positive scoring hypotheses to learn the weights $w_i$ in a max-margin discriminative framework.

Active Selection

The following discussion can be considered in the context of FIG. 2 relative to feature selection block 206. Some of the present implementations can operate on the assumption that there are M types of features that can be extracted from the image and a feature f takes $C_f$ units of time to obtain. Starting with a small sample of features $F_I$, which produce a set of candidate hypothesis, H={(O1,x1), (O2,x2) ... }, then, at every iteration, the active strategy chooses a feature type t and a location l=(x,y,s), following which the feature is extracted and added it to the feature pool at block 210 of FIG. 2. The candidate hypothesis set can be updated based on the newly added feature. This process can be repeated until either all features have been exhausted or the allotted time for detection has been exceeded.

To this end, the VOI criterion can be defined for image regions (e.g., grid parts) as well as the different kinds of local-features available. In particular, the technique can measure the VOI of a feature f of type t and an image location l as the ratio of the predicted gain in the scores of the current object hypotheses due to the feature compared to the computational cost of the feature. The active selection function can thus aim to greedily increase the score of every candidate hypothesis before the allotted time is used up. Formally, $$VOI(f, l) = \frac{\Delta S(O, x \mid f, l)}{C_f} \quad (5)$$

Note that another possible selection criterion is the difference between the gain and the cost; however, this tends to require the cost and the gain to be in the same currency. Instead, the VOI can be defined as the ratio, which intuitively seeks to maximize the gains per unit cost. The numerator of the above equation represents the expected improvement in S(O,x) once feature f at location l, is obtained with S(O,x) as defined in Equation 1. Or, in other words, $$\Delta S(O,x|f,l) = S(O,x|F \cup (f,l)) - S(O,x|F)$$

Computing the VOI of all the image regions is non-trivial since there is often very little information on most of the image regions. Furthermore, computing the VOI for a single location l can be problematic because of the large variations in the positions and/or scales of a category's instance across different images. However, note that in the present grid model, features affect the score of a hypothesis based on the evidence they provide for a grid part (Equation 1). Therefore, in some versions only the locations within the different grid parts of the current set of object hypotheses are considered; i.e. l corresponds to some part $g_i$ of hypothesis (O,x). Substituting the expression for S(O,x|F) from Equation 1 and denoting:

$$m_i^F = \max_{f \in F} p(g_i^{(O,x)} | f, l), \text{ can obtain,}$$

$$\Delta S(O, x | f, g_i^{(O,x)}) = w_i(m_i^{F \cup f} - m_i^F)$$
$$= w_i \max(0, (p(g_i^{(O,x)} | f, l) - m_i^F))$$

The above equation can be obtained by noting that when feature f occurs inside the grid part $g_i^{(O,x)}$ it can provide evidence for only the grid-part $g_i^{(O,x)}$. Therefore, the only two terms in Equation 1 affected by f are $w_i$ and $p(g_i^{(O,x)}|F)$. The second term is the maximum over all the features F and therefore it takes the value of the new feature f if it is larger than the current value and the current value otherwise.

Interestingly, the above equation contains two terms, where one ($w_i$) depends purely on the grid "location" i while the other depends on the "feature" f. Since $w_i$ has already been obtained using the max-margin framework described in the section titled "Estimating Model Parameters" the only unknown term is $p(g_i^{(O,x)}|f)$. This term depends on the feature f which is yet to be extracted.

However, since some implementations are only trying to determine the type of feature to extract, the expected value of the term $p(g_i^{(O,x)}|f)$ can be estimated for every feature type t. This can be done by considering all the features in the training database that are of type t and obtaining the average value of the term. The feature type with the largest value can be interpreted as the one that is expected to provide the best evidence for grid part $g_i$. For example, for the "body" of a giraffe, texture-based features could potentially provide the best evidence in most images they occur in and therefore could have a higher value for $p(g_i^{(O,x)}|f)$. In summary, some feature types can be relatively more indicative of the presence of an object portion than other feature types. The above technique identifies which feature type to utilize when evaluating an individual grid portion.

The VOI of all the grid locations of the current set of hypotheses can be calculated for every feature type using Equation 5. The location and feature type that is expected to provide the biggest gain in the object scores at the lowest cost is the one with the largest VOI.

Once the (potentially best) grid part $g_i^*$ and feature type t* are obtained, a small number of locations l can be sampled within the grid represented by grid part $g_i$ to extract features. The final issue is the scale at which features need to be extracted. This can simply be obtained based on the ratio of the height of the bounding box represented by (O,x) to the normalized height of the ground truth bounding boxes in the training examples.

In summary, the presently described concepts offer several contributions to computer vision scenarios. First, unlike standard object detection methods, the present implementations can return a partial answer, whose quality depends on the amount of computation allotted for the algorithm. Second, the proposed novel grid model can divide an object into a grid of image parts or regions and can enable computation of VOI for image parts as well as different kinds of local-features. This computation of VOI can be used to determine not only the (potentially) best parts (e.g., grid parts) in the image to analyze, but also the (potentially) best local features to extract from individual grid parts. Third, the present description derives an efficient and robust localization method that given the current evidence can use a Hough transform based voting scheme in conjunction with mean-shift clustering to estimate the modes in the hypothesis space. Thus, the present techniques can offer object category localization and classification of objects in images. These techniques can be effective even in cluttered, natural scene images.

Specific resource-aware computer vision examples are described above in great detail. The discussion below relative to FIG. 4 offers a broader conceptual view of these concepts.

Method Example

Figure 4:
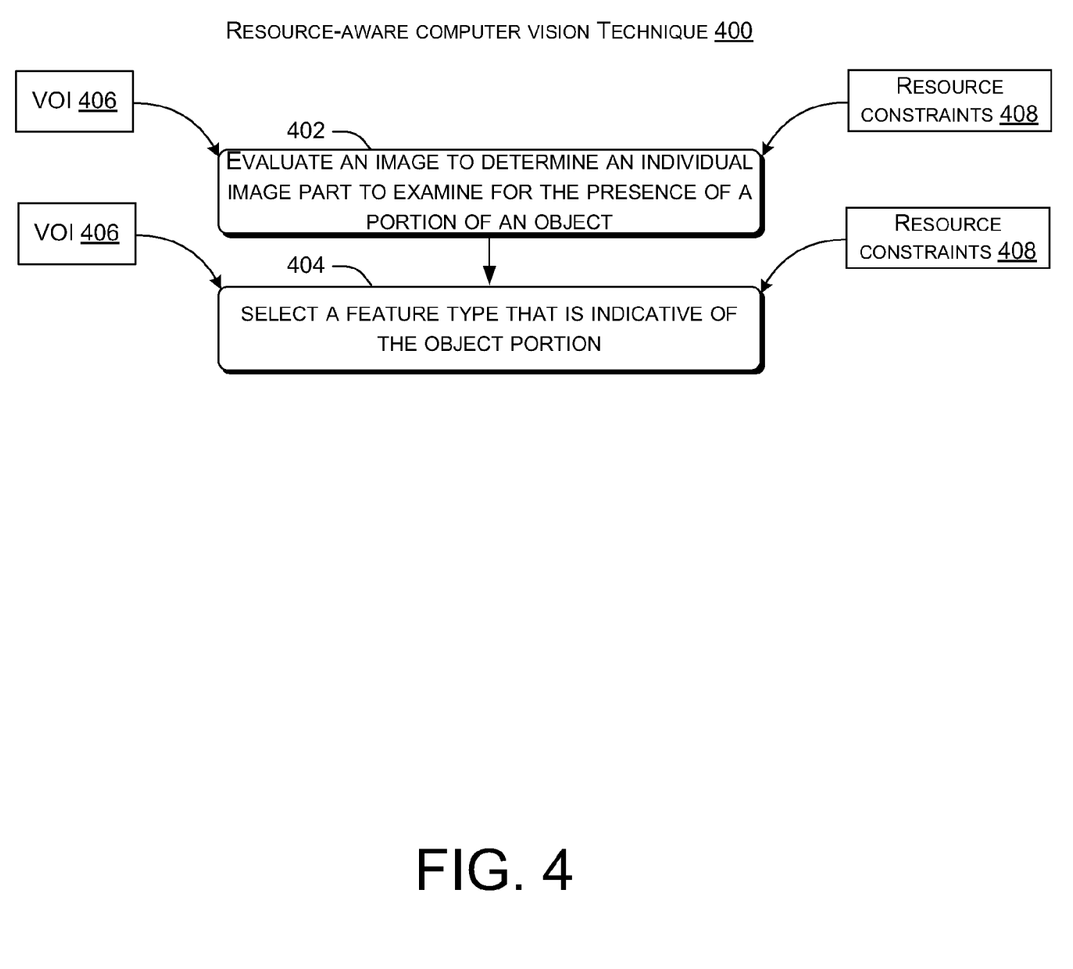

FIG. 4 shows a flowchart of a resource-aware computer vision technique or method 400 that is consistent with at least some implementations of the present concepts.

At block 402 the method can evaluate an image to determine an individual image part to examine for the presence of a portion of an object. Stated another way, the method can identify regions or parts of interest in the image that have a relatively high probability of containing all or a portion of a feature (i.e., at this point the "potential feature").

At block 404 the method can select a feature type that is indicative of the object portion. The evaluating and selecting of blocks 402 and 404 can be performed in consideration of a resultant value-of-information obtained. In some implementations, the evaluating and selecting can be performed in consideration of a VOI 406 obtained and resource constraints 408. Accordingly, the computations performed by the method can vary from platform to platform and/or by changes to the constraints within a platform. For instance, the computation strategy employed to accomplish blocks 402 and 404 in a relatively resource rich platform, such as a PC may be different than the computational strategy employed in a relatively resource constrained platform, such as a smart phone.

Alternatively or additionally, within an individual platform, such as the PC, the computational strategy may reflect the available resources in a given scenario or at a given instance in time. For instance, assume that in a first scenario most or all of the PC's resources are available to accomplish method 400 and that the user does not have any particular temporal expectations for when the method should be completed. Now consider another scenario where many competing applications are running on the PC and the user is waiting for the results of method 400. The computational strategies employed in these two scenarios on the PC to accomplish method 400 may be quite different.

The order in which the method 400 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

System Example

Figure 5:
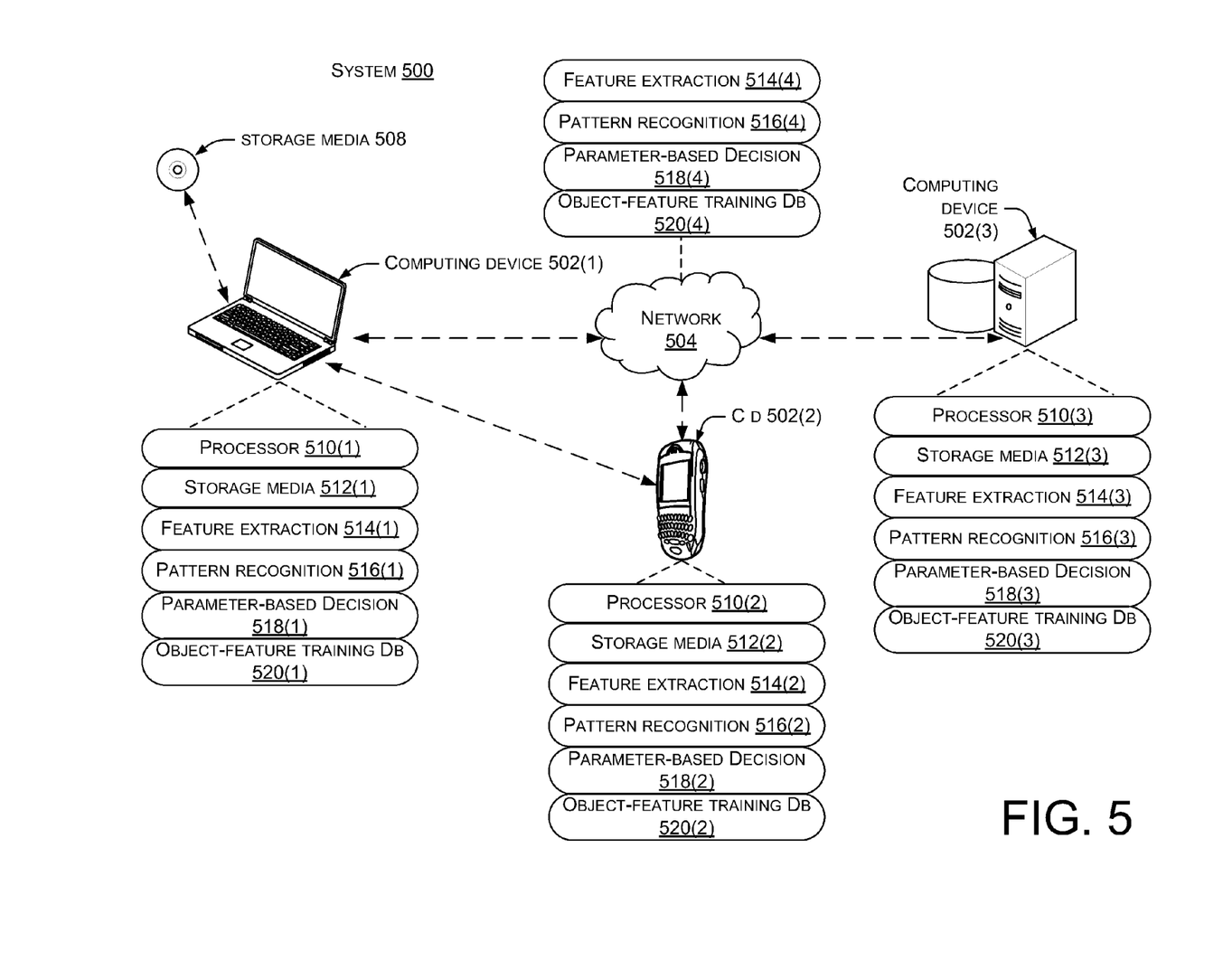
FIG. 5 is a system that can accomplish resource-aware computer vision techniques in accordance with some implementations of the present concepts.

FIG. 5 shows a system 500 that is configured to accomplish the resource-aware computer vision concepts described above and below. In this case, system 500 includes first, second, and third computing devices 502(1), 502(2) and 502(3). The computing devices can exchange data over a network 504. Alternatively or additionally, data may be exchanged directly between two devices as indicated, such as via a USB protocol or can be exchanged via a storage media 508. Individual computing devices can function in a stand-alone or cooperative manner to achieve image processing.

In this case, individual computing devices 502(1)-502(3) can include a processor 510, storage media 512, a feature extraction component 514, a pattern recognition component 516, a parameter-based decision component 518, and an object-feature training database 520.

Processor 510 can execute data in the form of computer-readable instructions to provide a functionality. Data, such as computer-readable instructions can be stored on storage media 512. The storage media 512 can include any one or more of volatile or non-volatile memory, hard drives, and/or optical storage devices (e.g., CDs, DVDs etc.), among others. The computing devices 502 can also be configured to receive and/or generate data in the form of computer-readable instructions from storage media 508 that for sake of explanation can be thought of as external storage media. Examples of external storage media can include optical storage devices (e.g., CDs, DVDs etc.), hard drives, and flash storage devices (e.g., memory sticks or memory cards), among others. The computing devices may also receive data in the form of computer-readable instructions over network 504 that is then stored on the computing device for execution by its processor.

Feature extraction component 514 can be configured to receive an image and to identify regions of the image for further evaluation. Examples of a region identification functionality that can be provided by the extraction component are described above relative to FIGS. 2-3.

Pattern recognition component 516 can be configured to recognize object portions from the image regions. Examples of an object recognition functionality that can be provided by the extraction component are described above relative to FIGS. 2-3.

Parameter-based decision component 518 can be configured to influence the feature extraction component 514 and the pattern recognition component 516 based upon at least one dynamic parameter. As mentioned above, the parameter can relate to various computing resources. In some cases, the processor 510, storage or storage media 512, operating system (not shown), and/or power (e.g., battery (not shown)) can be thought of as defining a 'platform' of an individual computing device. Parameters of the computing platform can be considered by the parameter-based decision component 518 in controlling the feature extraction component 514 and/or the pattern recognition component 516.

In some cases, the parameter-based decision component 518 can be static in that the platform configuration can be established and the parameter-based decision component can influence the feature extraction component 514 and the pattern recognition component 516 based upon the established platform configuration. Alternatively or additionally, the parameter-based decision component 518 can dynamically collect parameter information while the feature extraction component 514 and the pattern recognition component 516 are operating upon images and can dynamically influence their function.

As mentioned above, the function provided by either or both the feature extraction component 514 and the pattern recognition component 516 may be repeated in an iterative manner. The parameter-based decision component 518 may dynamically influence their functioning as they repeat. For instance, parameter-based decision component 518 may influence either or both of the feature extraction component 514 and the pattern recognition component 516 as a time constraint draws near or as the VOI drops below a predefined threshold. For example, the parameter-based decision component 518 may define the threshold based upon a 'good enough' value or a 'diminishing returns' value. The parameter-based decision component can monitor the progress of, for instance, each cycle performed by the feature extraction component 514 and the pattern recognition component 516. The parameter-based decision component can stop the processing and cause an output to be generated at such a time as the progress produced by an individual cycle or an average of a number of cycles falls below the threshold.

In some implementations, the parameter-based decision component 518 can cause the object-feature training database 520 to be generated. The object-feature training database can be generated from a set of training images. The training images can be processed to identify objects of interest in individual images. Further, for individual objects in the training images, the object-feature training database can identify which object portions are relatively highly indicative of the presence of the object. For example, in the discussion above, the giraffe's head and body can be more indicative of the giraffe's presence than the legs. Specific techniques to identify individual object portions and compare their relative indicative value are discussed above. Further still, the object-feature training database can identify individual features associated with individual object portions. The object-feature training database can rank the relative indicative values of the individual features associated with an object portion. For instance, relative to the example of FIG. 3, the rings and segments feature $f_1$ can be more indicative of the giraffe's body than the color spectrum feature $f_2$.

In summary, the object-feature training database 520 can contain training images and/or relate to training images. Further, the object-feature training database can contain object(s) of interest from the training images. The object-feature training database can map objects of interest to one or more object portions that are relatively highly indicative of the objects. It can further map from object portions to features that are indicative of the object portions. The object-feature training database can be generated at run time or in real time (e.g., when the images are received). In some cases, the object-feature training database can be generated at build time (e.g., prior to receiving the images) to potentially reduce latency associated with processing the received images.

As mentioned above, any of computing devices 502(1), 502(2), or 502(3) can function in a stand-alone configuration. Accordingly, each of the computing devices is shown with a complete complement of components. For instance, computing device 502(2) may have a camera or image capturing mechanism. The resident feature extraction component 514(2), pattern recognition component 516(2), parameter-based decision component 518(2) and object-feature training database 520(2) can process the images for the user. Other implementations may be more distributed in nature. For instance, computing device 502(2) may include extraction component 514(2), pattern recognition component 516(2), and parameter-based decision component 518(2), but may be lacking the object-feature training database. As such, the components of computing device 502(2) obtain the object-feature training database functionality from one of the other computing devices 502(1) or 502(3) or from cloud-based object feature training database 520(4).

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices. Further, a system can be manifest on a single computing device or distributed over multiple computing devices. Further still, the present techniques can be employed in other scenarios. For instance, in robotics scenarios the computer vision techniques can be useful for a computing device to be aware of objects in its surroundings.

Conclusion

Although techniques, methods, devices, systems, etc., pertaining to resource-aware computer vision are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
   a feature extraction component configured to receive an image and to identify parts of the image for further evaluation;
   a pattern recognition component configured to recognize object portions from the image parts;
   a parameter-based decision component configured to:
      evaluate both a current power constraint of the system and a value-of-information for at least one of the image parts, the value-of-information being influenced by the current power constraint, and
      determine whether to influence the feature extraction component and the pattern recognition component based upon the evaluation of the current power constraint and the value-of-information; and,
   a processor that executes computer-executable instructions associated with at least one of the feature extraction component, the pattern recognition component, or the parameter-based decision component.

2. The system of claim 1, wherein the pattern recognition component is further configured to identify a feature that is useful for recognizing an individual object portion.

3. The system of claim 1, wherein the parameter-based decision component is configured to obtain the value-of-information in relation to processing cycles of the feature extraction component and the pattern recognition component.

4. The system of claim 1, further comprising a set of training images that is accessible by the feature extraction component and the pattern recognition component and that relates individual features that are indicative of individual object portions.

5. The system of claim 1, wherein the parameter-based decision component is configured to stop the feature extraction component and the pattern recognition component before completion based on a diminishing returns value that is derived from the value-of-information.

6. The system of claim 1, wherein the parameter-based decision component is further configured to cause the feature extraction component and the pattern recognition component to implement an anytime solution that is influenced by the current power constraint of the system.

7. The system of claim 6, wherein the anytime solution includes stopping the feature extraction component and the pattern recognition component before completion.

8. The system of claim 1, wherein the parameter-based decision component is further configured to monitor progress of the feature extraction component and the pattern recognition component in individual processing cycles, the progress related to the value-of-information.

9. The system of claim 8, wherein the parameter-based decision component is further configured to influence the feature extraction component and the pattern recognition component to stop processing and generate an output when the progress produced in at least one of the individual processing cycles falls below a threshold.

10. The system of claim 8, wherein the parameter-based decision component is further configured to influence the feature extraction component and the pattern recognition component to stop processing and generate an output when an average amount of the progress produced in a number of the individual processing cycles falls below a threshold.

11. The system of claim 1, wherein the parameter-based decision component is further configured to allot an amount of computation to the feature extraction component and the pattern recognition component based upon the evaluation.

12. The system of claim 2, wherein the feature extraction component is configured to map the image utilizing a grid model to identify the image parts as grid parts.

13. The system of claim 12, wherein the feature extraction component is configured to access training data that identifies the feature that is indicative of the individual object portion contained in an individual grid part.

14. The system of claim 1, wherein the feature extraction component is configured to map the image utilizing a grid model to identify the image parts as grid parts and to compute the value-of-information for at least one grid part.

15. The system of claim 14, wherein the feature extraction component is further configured to compute another value-of-information for at least one local feature in the at least one grid part.

16. The system of claim 15, wherein the parameter-based decision component influences the feature extraction component to return a partial answer based on the value-of-information or the another value-of-information.

17. A system, comprising:
   a feature extraction component configured to receive an image and to identify parts of the image for further evaluation;
   a pattern recognition component configured to recognize object portions from the image parts;
   a parameter-based decision component configured to:
      calculate multiple value-of-information values in relation to processing cycles, wherein an individual value-of-information value is a ratio of gain in scores of a feature to computational cost of the feature,
      compare at least some of the multiple value-of-information values to determine a diminishing returns value, and
      determine whether to influence the feature extraction component and the pattern recognition component by comparing the diminishing returns value to a predefined threshold; and,
   a processor configured to execute computer-executable instructions associated with at least one of the feature extraction component, the pattern recognition component, or the parameter-based decision component.

18. The system of claim 17, wherein the parameter-based decision component is further configured to:
   compare a first value-of-information value calculated after a first processing cycle to a second value-of-information value calculated after a second processing cycle, yielding a first progress,
   compare the second value-of-information value to a third value-of-information value calculated after a third processing cycle, yielding a second progress,
   determine the diminishing returns value by comparing the first progress and the second progress, and influence the feature extraction component and the pattern recognition component to stop processing and generate an output when the diminishing returns value reaches the predefined threshold.

19. A system, comprising:
a feature extraction component configured to receive an image and to identify feature-location pairs in the image for further evaluation, an individual feature-location pair including an individual feature and a corresponding location;
a pattern recognition component configured to recognize object portions from features of the feature-location pairs;
a parameter-based decision component configured to:
evaluate constraints of computational resources of the system,
calculate value-of-information values for the feature-location pairs, wherein an individual value-of-information value is a function of both gain in scores associated with the individual feature at the corresponding location and computational cost related to the computational resources, and
determine whether to influence the feature extraction component and the pattern recognition component based upon the constraints of the computational resources and the value-of-information values; and,
a processor configured to execute computer-executable instructions associated with at least one of the feature extraction component, the pattern recognition component, or the parameter-based decision component.

20. The system of claim 19, wherein the parameter-based decision component is further configured to stop processing of the image and generate an output based upon the constraints of the computational resources.

* * * * *